United States Patent
Hawkins

[11] 4,050,597
[45] Sept. 27, 1977

[54] DOLLY FOR LIFTING AND TRANSPORTING VEHICLE WHEELS

[76] Inventor: Wallace H. Hawkins, Rte. 7, Buncombe Road, Greenville, S.C. 29609

[21] Appl. No.: 629,587

[22] Filed: Nov. 6, 1975

[51] Int. Cl.² .................. B60B 29/00; B65G 7/00
[52] U.S. Cl. .................. 214/331; 214/701 P
[58] Field of Search ............ 214/331, 332, 1 D, 330, 214/333, 660, 700, 701 R, 701 P

[56] References Cited

U.S. PATENT DOCUMENTS

| | | | |
|---|---|---|---|
| 2,217,898 | 10/1940 | Gemmill | 214/331 |
| 2,467,500 | 4/1949 | Salter | 214/331 |
| 2,997,193 | 8/1961 | Dunham | 214/660 |
| 3,036,723 | 5/1962 | McCormick et al. | 214/700 X |
| 3,145,859 | 8/1964 | Barosko | 214/331 |
| 3,749,265 | 7/1973 | Smith, Jr. | 214/331 |
| 3,847,294 | 11/1974 | Davenport | 214/332 |
| 3,951,287 | 4/1976 | Cofer | 214/331 |

*Primary Examiner*—Albert J. Makay
*Assistant Examiner*—R. B. Johnson
*Attorney, Agent, or Firm*—Bailey, Dority & Flint

[57] ABSTRACT

A wheel dolly is illustrated wherein threaded adjustment means are provided for adjusting the level of an inner substantially L-shaped wheel carrying frame within an outer substantially L-shaped wheeled support frame so that the level of the inner frame may be independently adjusted when elevated as into truck tire engaging position so that the proper level may be achieved for removing and replacing truck tires and the like.

2 Claims, 2 Drawing Figures

DOLLY FOR LIFTING AND TRANSPORTING VEHICLE WHEELS

BACKGROUND OF THE INVENTION

Wheel dollies, especially those utilized for removing and replacing tandem truck tire assemblies and the like, must provide support means for maintaining the tires in proper aligned relationship with respect to the truck axle. When replacing such tires on the axle, it is necessary that the tires be in such an aligned position as to allow the axle to receive the wheels. If the tires are out of alignment, then they often cannot be accommodated at all upon the axle and if misaligned to a lesser degree scoring of the metal of the rim and axle may result. When tires are being removed, alignment is important in order to avoid damage to engaging metal parts and to avoid damage to seals, threads and bearings.

Wheel dollies have been provided wherein a substantially L-shaped wheeled outer support frame carries an inner substantially L-shaped wheel carrying frame for vertical sliding movement thereon. Vertical movement may be imparted to the inner frame by jacking means which exert a force between the respective frames. Threaded means have been provided for adjusting the level of the outer support frame by providing a threaded support for a caster mounted centrally at the transverse juncture of the horizontal and vertical legs of the outer support frame. Such an arrangement possesses a disadvantage in that the base or outer support frame itself is adjusted in order to thereby adjust the level of the inner frame restrained thereon against pivotal movement. This adjustment becomes difficult when the inner frame is in elevated tire engaging position because the threaded member must be turned many times due to the relatively great distance between the central caster and casters carried by forward portions of the horizontal legs of the outer support frame. If the load is already on the wheel carrying frame further difficulties are encountered since it is necessary, when making the threaded adjustment, in effect to lift the entire load since it is the base or support frame whose level must be adjusted.

Accordingly, it is an important object of this invention to provide means for adjusting the inner wheel carrying frame of a wheel dolly with respect to the wheeled outer support frame which may be maintained in level position at all times.

Another important object of the invention is to provide a wheel dolly wherein threaded adjustments are made about a relatively short lever arm so as to minimize the number of turns which must be imparted to effectively adjust the wheel supporting legs of the wheel carrying frame.

Still another important object of the invention is to provide a wheel dolly wherein an inner wheel carrying frame may be tilted with respect to a wheeled outer support frame with a minimum adjustment to impart a tilting action to a load carried by the inner frame.

SUMMARY OF THE INVENTION

It has been found that a threaded adjustment may be provided for adjusting the position of an inner wheel carrying frame with respect to a wheeled outer support frame by providing a pivotal connection between the respective frames and by positioning a threaded means for controlling the distance between respective frame members in a position adjacent the pivotal connection. Thus, the threaded adjustment may be carried out relatively close to the inner frame when in work engaging position with a minimum amount of turning of the threads to affect a tilting engagement with the load to be carried by the inner frame.

BRIEF DESCRIPTION OF THE DRAWING

The construction designed to carry out the invention will be hereinafter described, together with other features thereof.

The invention will be more readily understood from a reading of the following specification and by reference to the accompanying drawing forming a part thereof, wherein an example of the invention is shown and wherein.

DESCRIPTION OF A PREFERRED EMBODIMENT

Figure 1:
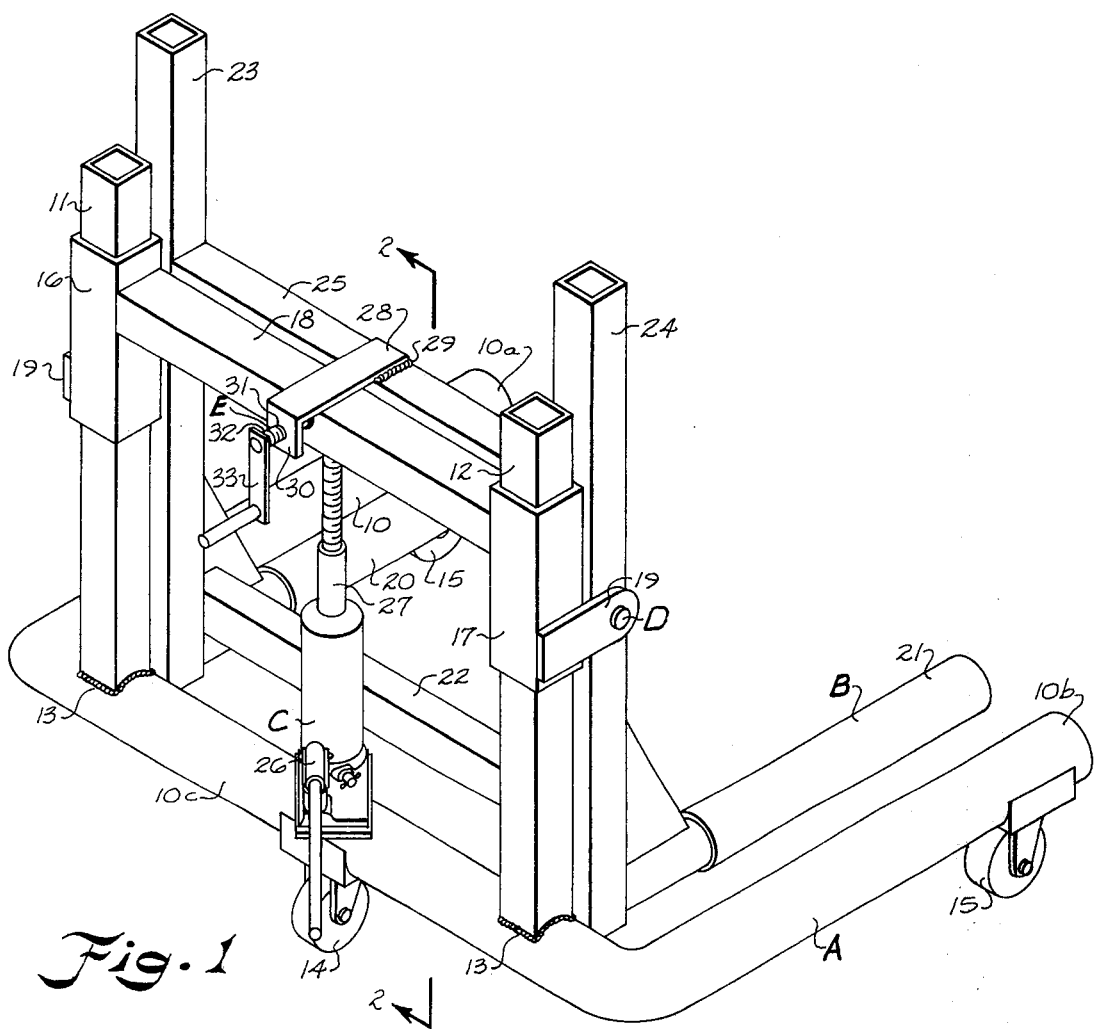
FIG. 1 is a perspective view illustrating a wheel dolly, having a threaded adjustment means to adjust the angle of the inner wheel carrying frame with respect to wheeled outer support frame constructed in accordance with the invention.
Figure 2:
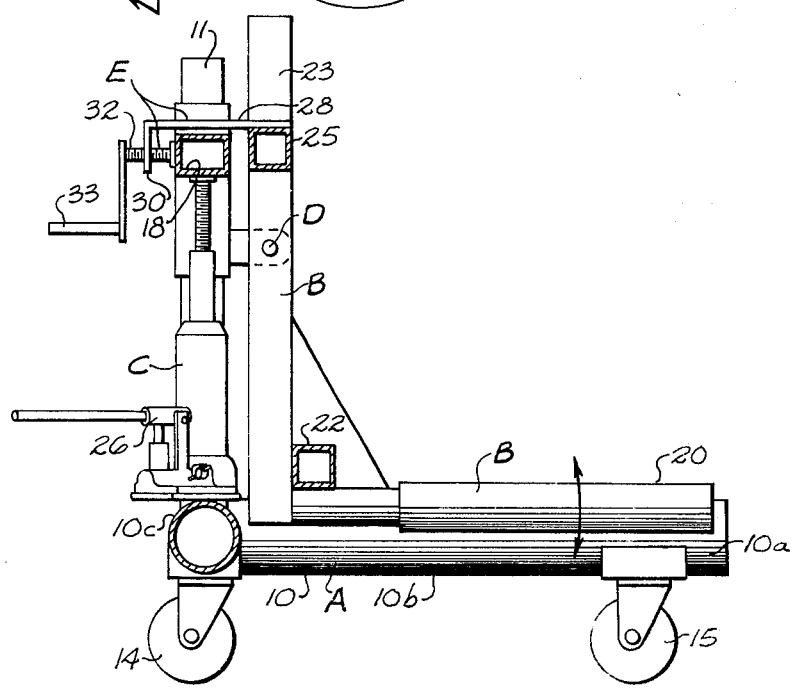
FIG. 2 is a longitudinal sectional elevation taken on the line 2—2 in FIG. 1.

The drawing illustrates a wheel dolly having a substantially L-shaped wheeled outer support frame A. An inner substantially L-shaped wheel carrying frame B includes means carried for vertical sliding movement on the outer support frame as well as lateral wheel supporting legs. Jacking means C are carried by the outer support frame for exerting a lifting force upon the inner wheel carrying frame. A pivotal connection D is provided between the means carried for vertical sliding movement and the lateral wheel supporting legs. Threaded means E tilt the wheel supporting legs about the pivotal connection and restrain the wheel supporting legs in tilted position for maintaining a wheel supported thereby in proper position in respect to a vehicle axle.

The L-shaped wheeled outer support frame A includes a horizontal substantially U-shaped member 10 which includes a pair of laterally extending legs 10a and 10b which are bridged adjacent one end by the member 10c. A pair of spaced vertical legs 11 and 12 have fixed connection at their lower ends on the bridging member 10c as by welding as at 13. A central caster 14 supports the bridging member 10c while casters 15 are carried adjacent a forward end of the laterally extending legs 10a and 10b. A pair of vertical sleeves 16 and 17 are slidably carried on the posts 11 and 12 respectively. The sleeves 16 and 17 are bridged by a substantially horizontal frame member 18. Each of the sleeves 16 and 17 have a forward projection 19 fixed thereto for pivotally connecting the inner frame B to the outer frame A, as will be described in greater detail below.

The frame B includes a pair of laterally extending wheel supporting legs 20 and 21 which are bridged by a support member 22 in aligned relation within the U-shaped member 10 of the outer support frame A. A pair of spaced vertical members 23 and 24 are bridged by the frame member 25. The vertical legs 23 and 24 may be integral with the lateral wheel supporting legs 20 and 21.

A jack mechanism C is so positioned as to exert a force between the respective frame members A and B in order to raise the frame A with respect to the frame B. This may be accomplished by fixing a cylinder of a jacking mechanism 26 centrally upon the bridging member 10c so that a ram portion 27 may centrally engage the bridging member 18 to raise the slides 16 and 17 upon the vertical legs 11 and 12. Thus, the wheel carrying frame B may be elevated with respect to the wheeled outer support frame A. As explained above, the inner frame B is connected by a pivotal connection to the outer frame A. This is accomplished by providing a pivotal connection D at an intermediate point along the respective vertical legs 23 and 24 of the inner frame member B.

The bridging member 25 extends between the vertical legs 23 and 24 at a position above the pivotal connection D. A horizontal longitudinally extending connecting portion 28 extends longitudinally from the transverse bridging member 18. The longitudinally extending connecting member 28 has fixed connection with the transverse bridging member 25 as by welding at 29. The longitudinal member 28 extends over the bridging member 18 and has a downwardly depending leg 30 which has an internal threaded opening 31 therein for receiving a threaded shank member 32 which has a crank 33 carried thereby for making the threaded adjustment. It will be observed that the innermost end of the threaded shank 32 remote from the handle 33 engages the bridging member 18 by threading the shank member 32 in and out with respect to the threaded opening 31. The distance between the transverse bridging members 25 and 18 may be varied to adjust the tilted relationship of the inner frame B with respect to the outer frame A.

Since the threaded adjustment is made over a relatively short lever arm between the pivot D and the slide carried transverse bridging member 18, a relatively small adjustment accomplishes the desired change in relationship between the load-carrying arms 20 and 21 and the truck wheels to be received thereon. Moreover, by tilting only the inner frame wheel maintaining the outer or base frame in a level position at all times, only the wheels need be tilted in order to effect the necessary adjustment.

While a preferred embodiment of the invention has been described using specific terms, such description is for illustrative purposes only, and it is to be understood that changes and variations may be made without departing from the spirit or scope of the following claims.

What is claimed is:

1. A wheel dolly including:
    a substantially L-shaped wheeled outer support frame;
    said support frame including a pair of spaced vertical posts and a pair of spaced legs extending horizontally therefrom;
    an inner substantially L-shaped wheel carrying frame;
    said inner wheel carrying frame including a pair of spaced vertical posts aligned with said first mentioned vertical posts and a pair of spaced load carrying legs extending horizontally therefrom within said first mentioned legs;
    elongated vertical sleeves (means) carried by said first mentioned legs for vertical sliding movement on said outer support frame;
    jacking means carried by said outer support frame for exerting a lifting force upon said inner wheel carrying frame;
    a transverse horizontal pivotal connection between a lower portion of said sleeves (said means carried for vertical sliding movement) and said inner wheel carrying frame; (and)
    a horizontal bridging member connecting upper portions of said sleeves;
    a horizontal bridging member connecting said spaced vertical post of said inner wheel carrying frame opposite said first mentioned bridging member; and
    threaded means exerting a force between said bridging members for tilting said inner wheel carrying frame about said pivotal connection restraining said inner wheel carrying frame in tilted position for maintaining a wheel supported thereby in proper position in respect to a vehicle axle.

2. The structure set forth in claim 1 including a depending member having fixed connection with said bridging member of said inner wheel carrying frame encompassing said first mentioned bridging member carrying said threaded means for bearing against said first mentioned bridging member.

* * * * *